United States Patent [19]
Frey et al.

[11] Patent Number: 5,488,957
[45] Date of Patent: Feb. 6, 1996

[54] SYSTEM AND METHOD FOR PROMOTING ADHESION BETWEEN LENS AND MATCHING LAYER OF ULTRASONIC TRANSDUCER

[75] Inventors: Gregg W. Frey, East Wenatchee, Wash.; Jonathan E. Snyder, Whitefish Bay; Leslie J. Keres, Waukesha, both of Wis.

[73] Assignee: General Electric Company, Milwaukee, Wis.

[21] Appl. No.: 343,053

[22] Filed: Nov. 21, 1994

[51] Int. Cl.⁶ .................................................. A61B 8/00
[52] U.S. Cl. .................................................. 128/663.01
[58] Field of Search ........................ 128/662.04, 662.03, 128/663.01; 73/642, 644; 310/334, 335, 322

[56] References Cited

U.S. PATENT DOCUMENTS 4,348,904  9/1982  Bautista, Jr. ............................. 73/644
4,503,861  3/1985  Entrekin ............................. 128/662.04

*Primary Examiner*—George Manuel
*Attorney, Agent, or Firm*—Dennis M. Flaherty; John H. Pilarski

[57] ABSTRACT

An adhesion system specifically designed to achieve a good-quality adhesive bond between a silicone rubber lens and a plastic matching layer of an ultrasonic transducer. The adhesion system includes a layer of conventional silicone adhesive applied on the silicone rubber lens and a layer of dichloro-di-p-xylylene residing between the silicone adhesive and the plastic matching layer. The layer of dichloro-di-p-xylylene is adhered to the silicone adhesive via a silicone primer and is adhered to the plastic matching layer via a silane primer. The layer of dichloro-di-p-xylylene provides adhesion promotion, a chemical barrier to protect the transducer array from the external environment and an electrical barrier to help protect the patient from the electrically alive transducer elements, without any adverse effect on the acoustic transmission characteristics of the transducer stack.

18 Claims, 1 Drawing Sheet

SYSTEM AND METHOD FOR PROMOTING ADHESION BETWEEN LENS AND MATCHING LAYER OF ULTRASONIC TRANSDUCER

FIELD OF THE INVENTION

This invention generally relates to probes used in ultrasonic imaging of the human anatomy. In particular, the invention relates to methods for bonding a lens to an acoustic impedance matching layer of an ultrasonic transducer assembly.

BACKGROUND OF THE INVENTION

A conventional ultrasonic probe comprises a transducer package which must be supported within a probe housing. As shown in FIG. 1, a conventional transducer package 2 comprises a linear array 4 of narrow transducer elements. Each transducer element is made of piezoelectric ceramic material. The piezoelectric material is typically lead zirconate titanate (PZT), polyvinylidene difluoride, or PZT ceramic/polymer composite.

Typically, each transducer element has signal electrodes and ground electrodes formed on opposing faces thereof. The signal electrodes can be connected to a signal source via conductive traces on a flexible printed circuit board (PCB) 6.

The transducer package 2 also comprises a mass of suitable acoustical damping material having high acoustic losses, e.g., silver epoxy, positioned at the back surface of the transducer element array 4. This backing layer 8 is coupled to the rear surface of the transducer elements to absorb ultrasonic waves that emerge from the back side of each element so that they will not be partially reflected and interfere with the ultrasonic waves propagating in the forward direction.

Before installation into the probe housing 2, the transducer element array 4, flexible PCB 6 and backing layer 8 are bonded together in a stack-up arrangement which is secured inside a four-sided array case 10, i.e., a "box" having four side walls but no top or bottom walls. The array case protects the fragile transducer elements during probe assembly.

Typically, a first acoustic impedance matching layer 12 is bonded to the bottom the transducer stack-up, as shown in FIG. 1. A second acoustic impedance matching layer 14 is later bonded to the first acoustic impedance matching layer 12. The acoustic impedance of the second matching layer must be less than the acoustic impedance of the first matching layer and greater than the acoustic impedance of the human body or water. For example, the second matching layer 14 may consist of a plastic material, such as polysulfone, which has excellent acoustic transmission properties.

The front face of the second or outermost acoustic impedance matching layer is conventionally bonded to the planar rear face of a convex cylindrical lens 16 using an acoustically transparent thin layer of silicone adhesive. Lens 16 serves three purposes: (1) acoustic focusing (due to its lens-shaped cross section and its low acoustic velocity material properties); (2) providing a chemical barrier to protect the transducer elements from attack by gels, body fluids, cleaning agents, etc.; and (3) providing an electrical barrier to protect the patient from the electrically active transducer elements. The lens is conventionally made of silicone rubber.

Typically the silicone rubber lens 16 is bonded to the plastic matching layer 14 by a layer 18 of silicone adhesive, as depicted in FIG. 2. However, it is difficult to achieve a high-quality adhesive bond between the silicone rubber lens and the plastic matching layer because these materials have very different adherability characteristics. This presents a problem because an intimate bond between the silicone rubber lens and the plastic matching layer is required in order to produce the desired acoustic transmission characteristics and mechanical stability.

SUMMARY OF THE INVENTION

The present invention solves the problem of poor adhesive bonding between the silicone rubber lens and the plastic acoustic impedance matching layer of an ultrasonic transducer stack by using an adhesive system that bonds well to both silicone rubber and plastic. The adhesion system in accordance with the preferred embodiment of the invention includes a layer of silicone adhesive applied on the silicone rubber lens and a layer of dichloro-di-p-xylylene (also known as "dichloro-(2,2)paracyclophane") residing between the silicone adhesive and the plastic matching layer. The layer of dichloro-di-p-xylylene is adhered to the silicone adhesive via a silicone primer and to the plastic matching layer via a silane primer. The layer of dichloro-di-p-xylylene provides adhesion promotion, a chemical barrier to protect the transducer array from the external environment and an electrical barrier to help protect the patient from the electrically alive transducer elements, without any adverse effect on the acoustic transmission characteristics of the transducer stack.

Dichloro-di-p-xylylene is a thin plastic film (typically only a few microns thick) that is conventionally deposited onto surfaces under a vacuum. Dichloro-di-p-xylylene has a very high dielectric strength and therefore is often used as a circuit board coating. In the present invention, dichloro-di-p-xylylene is used as an electrical and chemical barrier. However, the invention is unique in its particular use of dichloro-di-p-xylylene as an adhesion-promoting layer between two material layers having different adherability characteristics. In particular, dichloro-di-p-xylylene is used to promote adhesion between the silicone rubber lens and the plastic matching layer of an ultrasonic transducer.

The method for manufacturing a transducer stack in accordance with the present invention comprises six basic steps. (1) The stack subassembly, comprising the transducer array, matching layers and lens, is ultrasonically cleaned in deionized water. (2) A layer of silane primer is applied on the surface of the outermost matching layer. (3) A thin film of dichloro-di-p-xylylene is vacuum-deposited onto the primed subassembly. (4) The surface of the dichloro-di-p-xylylene film is plasma-etched. (5) A layer of silicone primer is applied on the etched surface of the dichloro-di-p-xylylene film. (6) A layer of silicone adhesive is applied on the surface of the silicone primer and the silicone rubber lens is affixed to the silicone adhesive before the latter has dried. All of these steps are performed at room temperature.

The layer of dichloro-di-p-xylylene provides adhesion promotion, a chemical barrier to protect the transducer array from the external environment and an electrical barrier to help protect the patient from the electrically alive transducer elements, without any adverse effect on the acoustic transmission characteristics of the transducer stack.

DETAILED DESCRIPTION OF THE PREFERRED EMBODIMENT

Figure 1:
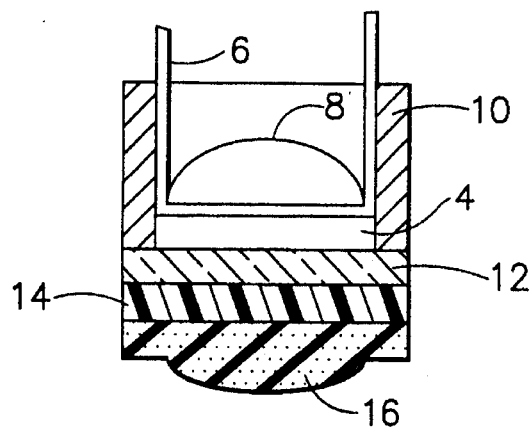
FIG. 1 is a schematic sectional view of a conventional ultrasonic transducer stack.
Figure 2:
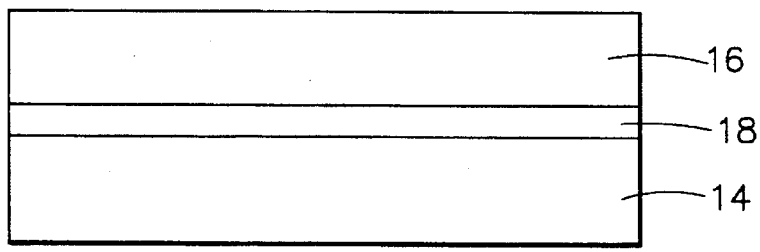
FIG. 2 is a schematic sectional view showing the conventional technique for bonding a silicone rubber lens to a plastic matching layer.
Figure 3:
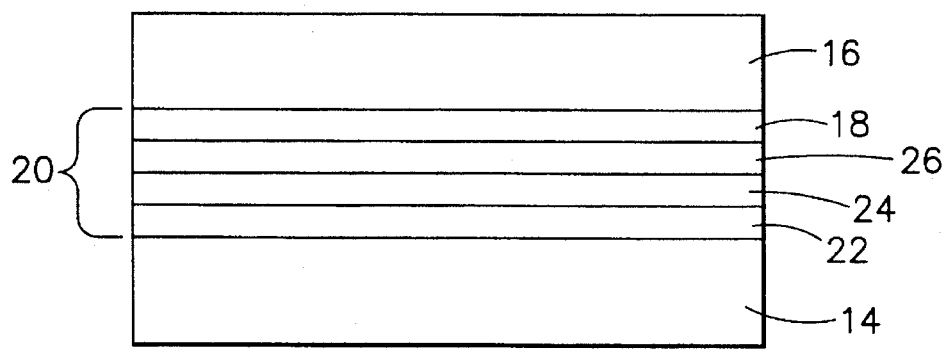
FIG. 3 is a schematic sectional view showing the adhesion system for bonding a silicone rubber lens to a plastic matching layer in accordance with the preferred embodiment of the present invention.

The adhesion system in accordance with the preferred embodiment of the invention is depicted in FIG. 3. A silicone rubber layer or lens 16 is bonded to the front face of a plastic matching layer 14 by an adhesion system 20 consisting of: (1) a layer 22 of silane primer adhered to the plastic acoustic impedance matching layer 14; (2) a thin film 24 of dichloro-di-p-xylylene vacuum-deposited on the silane primer layer 22; (3) a layer 26 of silicone primer adhered to the thin film 24 of dichloro-di-p-xylylene; and (4) a layer 18 of silicone adhesive adhered to the silicone primer layer 26.

The dichloro-di-p-xylylene used in the present invention is a white granular solid commercially available under the product name Parylene Dimer DPX-C from Union Carbide Chemicals and Plastics Co., Inc., Specialty Chemicals Division, Danbury, Conn. Another name for dichloro-di-p-xylylene is "dichloro-(2,2)paracyclophane". Dichloro-di-p-xylylene has a very high dielectric strength and for that reason is conventionally used as a circuit board coating to provide an electrical and chemical barrier.

The silane primer used is a commercially available parylene deposition bonding agent marketed under the product name A174 Silane by Nova Tran, Clear Lake, Wis. A174 Silane is an effective interfacial bonding agent for parylene coating preparation. This material creates chemical linkages at the molecular level with both the parylene coating and the plastic matching layer, promoting complete adhesion with the vacuum-deposited parylene coating. The chemical agent in A174 Silane is gamma-methacryloxypropyltrimethoxysilane The silicone primer used is a commercially available solvent marketed under the product name SS4155 by General Electric Company, GE Silicones, Waterford, N.Y. SS4155 silicone primer mixture contains approximately 60–80 wt. % petroleum distillates, approximately 10–30 wt. % tetraethylorthosilicate, and a balance of an alkoxy silane and a transition metal ester. These ingredients create chemical linkages at the molecular level with both the parylene coating and the silicone rubber lens.

The adhesion bonding technique of the present invention is used to bond a silicone rubber lens to the plastic matching layer of a diced transducer array. First, low-tack adhesive film is used to cover the exposed surfaces of the flex circuit beyond the edge of the array case. Then a strip of Teflon tape is applied all the way around the array case so that the edge of the tape is about 2 mm back from the front face of the array. This tape keeps parylene off the sides and ends of the array case to permit good electrical connection of signal grounds.

After initial preparation of the transducer stack, the silane primer is prepared. A beaker is filled with 100 ml of deionized water. Then 100 ml of isopropyl alcohol is added to the deionized. Then 1 ml of A174 silane is added. A magnetic stirring impeller is placed into the beaker and the solution is stirred for 2 hours at room temperature. When the silane primer is ready for use, silane solution is poured into a petri dish large enough to hold the transducer arrays being processed to a depth of 3 or 4 mm.

Before the transducer arrays can be coated with the silane primer, the surface of the acoustic impedance matching layer must be cleaned. This is accomplished by putting about 3 mm of isopropyl alcohol into a petri dish large enough to hold the transducer arrays being processed. Then the arrays are placed face down in the alcohol bath and soaked for 5 to 10 minutes. After the arrays are removed from the alcohol bath, excess alcohol is air-blown out of the kerfs of the diced array. The arrays are then placed face down in the dish containing the silane solution and allowed to soak for 10 to 12 minutes. After the arrays are removed from the silane primer solution, excess primer is air-blown out of the kerfs. The primed arrays are then air-dried for 5 to 15 minutes, placed face down in clean isopropyl alcohol and allowed to soak for 5 to 6 minutes, removed from the alcohol and then blow-dried.

A specialty coating system having a vaporizer with a furnace and a vacuum chamber with a cold trap is used to perform parylene deposition. The bare metal parts of the vacuum chamber and cold trap which will be exposed to parylene must be wiped with a detergent solution. This detergent acts as a release film after parylene has been deposited. Then the required quantity by weight of parylene is placed in a boat and the boat is loaded into the vaporizer. The vaporizer door is closed and latched. Then the bell jar of the vacuum chamber is removed and the vacuum chamber is loaded with the parts to be coated. Those parts of the array to be coated must not be closer than 5 mm to any surface. Then the bell jar is replaced with its sealing surfaces properly seated. Then the furnace, evacuator, vaporizer and chiller are all turned on. The furnace melts the parylene. The evacuator creates a vacuum inside the vacuum chamber. The vaporizer atomizes the molten parylene into a flow of air which is ejected into the evacuated vacuum chamber. The chiller cools the cold trap, by means of which droplets of parylene deposited on the parts are solidified to form the desired parylene coating. The deposition process takes about 3 hr. The run is complete when the parylene supply is exhausted. The system is vented and the arrays are removed.

In a subsequent stage, the surface of the parylene film deposited on the front face of the plastic matching layer is plasma-etched. Then the plasma-etched surface is coated with a layer of silicone primer. A layer of silicone adhesive is applied on the surface of the silicone primer and the silicone rubber lens is affixed to the silicone adhesive before the latter has cured. The entire assembly is then ready to be installed inside a probe housing.

The foregoing preferred embodiment have been disclosed for the purpose of illustration. Variations and modifications which do not depart from the broad concept of the invention will be readily apparent to those skilled in the design of ultrasonic probes. In particular, application of the invention is not limited to acoustic impedance matching layers made of plastic. All such variations and modifications are intended to be encompassed by the claims set forth hereinafter.

We claim:

1. An ultrasound transducer in the form of a stack of layers bonded one on top of another and comprising:

a planar array of piezoelectric transducer elements;

an acoustic impedance matching layer acoustically coupled to said planar array;

a silicone rubber lens acoustically coupled to said acoustic impedance matching layer;

a layer of silicone adhesive adhered to said silicone rubber lens; and an adhesive laminate for adhering said layer of silicone adhesive to said acoustic impedance matching layer, wherein said adhesive laminate comprises a layer of plastic material and wherein said plastic material is a member of the p-xylylene family.

2. The ultrasound transducer as defined in claim 1, wherein said plastic material is dichloro-di-p-xylylene.

3. An ultrasound transducer in the form of a stack of layers bonded one on top of another and comprising:

a planar array of piezoelectric transducer elements;

an acoustic impedance matching layer acoustically coupled to said planar array;

a silicone rubber lens acoustically coupled to said acoustic impedance matching layer;

a layer of silicone adhesive adhered to said silicone rubber lens; and an adhesive laminate for adhering said layer of silicone adhesive to said acoustic impedance matching layer, wherein said adhesive laminate comprises a layer of plastic material and wherein said adhesive laminate further comprises a layer of silane primer adhered to said acoustic impedance matching layer and to said layer of plastic material.

4. The ultrasound transducer as defined in claim 3, wherein said silane primer comprises gamma-methacryloxypropyltrimethoxysilane.

5. An ultrasound transducer in the form of a stack of layers bonded one on top of another and comprising:

a planar array of piezoelectric transducer elements;

an acoustic impedance matching layer acoustically coupled to said planar array;

a silicone rubber lens acoustically coupled to said acoustic impedance matching layer;

a layer of silicone adhesive adhered to said silicone rubber lens; and an adhesive laminate for adhering said layer of silicone adhesive to said acoustic impedance matching layer, wherein said adhesive laminate comprises a layer of plastic material and wherein said adhesive laminate further comprises a layer of silicone primer adhered to said layer of silicone adhesive and to said layer of plastic material.

6. The ultrasound transducer as defined in claim 5, wherein said silicone primer comprises an alkoxysilane.

7. The ultrasound transducer as defined in claim 6, wherein said silicone primer comprises a transition metal ester.

8. The ultrasound transducer as defined in claim 6, wherein said silicone primer comprises tetraethylorthosilicate.

9. An ultrasound transducer comprising a plurality of layers bonded in a stack, said plurality of layers comprising a first layer bonded to a second layer by adhesive means, said adhesive means comprising a thin film consisting of a plastic material which is a member of the p-xylylene family.

10. The ultrasound transducer as defined in claim 9, wherein said first layer is a plastic acoustic impedance matching layer, said second layer is a silicone rubber lens acoustically coupled to said acoustic impedance matching layer, and said adhesive means further comprise a layer of silicone adhesive adhered to said silicone rubber lens.

11. The ultrasound transducer as defined in claim 10, wherein said adhesive means further comprise a layer of silane primer adhered to said plastic acoustic impedance matching layer and to said layer of plastic material which is a member of the p-xylylene family to said layer of silicone adhesive and to said layer of plastic material which is a member of the p-xylylene family.

12. The ultrasound transducer as defined in claim 11, wherein said silane primer comprises gamma-methacryloxypropyltrimethoxysilane.

13. The ultrasound transducer as defined in claim 11, wherein said silicone primer comprises an alkoxysilane, a transition metal ester and tetraethylorthosilicate.

14. A method for adhesively bonding a first layer of a first material to a second layer of a second material, comprising the steps of:

applying a layer of silane primer onto a surface of said first layer;

depositing a layer of plastic material onto said layer of silane primer;

applying a layer of silicone primer onto said layer of plastic material;

applying a layer of silicone adhesive onto said layer of silicone primer; and affixing said second layer to said layer of silicone adhesive, wherein said plastic material is a member of the p-xylylene family.

15. The bonding method as defined in claim 14, wherein said plastic material is dichloro-di-p-xylylene.

16. The bonding method as defined in claim 14, wherein said silane primer comprises gamma-methacryloxypropyltrimethoxysilane.

17. The bonding method as defined in claim 14, wherein said silicone primer comprises an alkoxy silane, a transition metal ester and tetraethylorthosilicate.

18. The bonding method as defined in claim 14, wherein said first material is plastic and said second material is silicone rubber.

* * * * *